United States Patent
Sugimoto et al.

(10) Patent No.: US 10,599,510 B2
(45) Date of Patent: Mar. 24, 2020

(54) COMPUTER SYSTEM AND ERROR ISOLATION METHOD

(71) Applicant: Hitachi, Ltd., Chiyoda-ku, Tokyo (JP)

(72) Inventors: Ken Sugimoto, Tokyo (JP); Yusuke Funaya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 219 days.

(21) Appl. No.: 15/740,078

(22) PCT Filed: Jul. 8, 2015

(86) PCT No.: PCT/JP2015/069626
§ 371 (c)(1),
(2) Date: Dec. 27, 2017

(87) PCT Pub. No.: WO2017/006457
PCT Pub. Date: Jan. 12, 2017

(65) Prior Publication Data
US 2018/0189126 A1 Jul. 5, 2018

(51) Int. Cl.
*G06F 11/00* (2006.01)
*G06F 11/07* (2006.01)
*G06F 11/30* (2006.01)
*G06F 1/26* (2006.01)

(52) U.S. Cl.
CPC ............ *G06F 11/079* (2013.01); *G06F 1/266* (2013.01); *G06F 11/0709* (2013.01); *G06F 11/0751* (2013.01); *G06F 11/0772* (2013.01); *G06F 11/0775* (2013.01); *G06F 11/0793* (2013.01); *G06F 11/30* (2013.01)

(58) Field of Classification Search
CPC ............ G06F 11/0763; G06F 11/0766; G06F 11/0772; G06F 11/079; G06F 11/0751
See application file for complete search history.

(56) References Cited

U.S. PATENT DOCUMENTS

| | | | | |
|---|---|---|---|---|
| 5,680,537 | A * | 10/1997 | Byers | G06F 11/2268 714/5.11 |
| 5,931,958 | A * | 8/1999 | Bouvier | G06F 11/0727 714/48 |
| 6,728,216 | B1 * | 4/2004 | Sterner | H04L 1/0002 370/252 |
| 8,140,922 | B2 | 3/2012 | Haraden et al. | |
| 8,510,592 | B1 * | 8/2013 | Chan | G06F 11/0751 714/5.1 |

(Continued)

*Primary Examiner* — Bryce P Bonzo
*Assistant Examiner* — Jeison C Arcos
(74) *Attorney, Agent, or Firm* — Procopio, Cory, Hargreaves & Savitch LLP

(57) ABSTRACT

A computer system comprises a computer being coupled to a device via a device interface. The device interface has an error status register and a link status register. An error isolation unit periodically obtains values of the error status register and the link status register. The error isolation unit determine whether an error occurs in the device; determine whether the error is an error to be isolated; determine whether the error is an error to be isolated based on values of the error status register and the link status register re-obtained after elapse of a predetermined time in a case of determining the error is not to be isolated. The error isolation unit detects the error as an error of a protocol caused by stop of a power supply in a case of determining the error is to be isolated.

10 Claims, 10 Drawing Sheets

(56) References Cited

U.S. PATENT DOCUMENTS

| | | | | |
|---|---|---|---|---|
| 2002/0184576 A1* | 12/2002 | Arndt | G06F 11/0712 | 714/48 |
| 2006/0104209 A1* | 5/2006 | De Araujo | G06F 11/0727 | 370/242 |
| 2007/0286385 A1* | 12/2007 | Varble | H04M 7/0066 | 379/201.12 |
| 2008/0228941 A1* | 9/2008 | Popescu | H04L 43/00 | 709/238 |
| 2009/0248947 A1* | 10/2009 | Malwankar | G06F 13/404 | 710/316 |
| 2010/0074264 A1* | 3/2010 | Davis | G06F 11/0709 | 370/401 |
| 2011/0246833 A1* | 10/2011 | Bockhaus | H04L 43/0847 | 714/37 |
| 2012/0294606 A1* | 11/2012 | Miller | H04L 43/0811 | 398/27 |
| 2013/0246855 A1* | 9/2013 | Nishiyama | G06F 11/079 | 714/37 |
| 2014/0006670 A1* | 1/2014 | Wagh | G06F 13/4027 | 710/305 |
| 2014/0115359 A1* | 4/2014 | Higuchi | G06F 1/3206 | 713/320 |
| 2014/0189427 A1* | 7/2014 | Jayaprakash Bharadwaj | G06F 11/1415 | 714/15 |
| 2015/0032405 A1* | 1/2015 | Li | H04L 69/24 | 702/122 |
| 2015/0089332 A1* | 3/2015 | Chambers | H03M 13/6306 | 714/807 |
| 2015/0281126 A1* | 10/2015 | Regula | G06F 13/4022 | 709/212 |
| 2015/0370683 A1* | 12/2015 | Nishiyama | G06F 13/4282 | 714/43 |
| 2018/0131573 A1* | 5/2018 | Matsuda | H04L 63/107 | |

\* cited by examiner

ERROR STATUS REGISTER 142

| DESCRIPTION OF ERROR 401 | ERROR OCCURRENCE BIT 402 |
|---|---|
| Surprise Down Error | 1 |
| Data Link Protocol Error | 0 |
| Poisoned TLP | 0 |
| Flow Control Protocol Error | 0 |
| Completion Timeout | 0 |
| Completer Abort | 0 |
| Unexpected Completion | 0 |
| Receiver Overflow | 0 |
| Malformed TLP | 0 |
| ECRC Error | 0 |
| Unsupported Request | 0 |
| ACS Violation Error | 0 |
| Uncorrectable Internal Error | 0 |
| MC Blocked TLP | 0 |
| AtomicOp Egress Blocked | 0 |
| TLP Prefix Blocker | 0 |

*FIG. 4*

ERROR MASK REGISTER 143

| DESCRIPTION OF ERROR (501) | ERROR NOTIFICATION MASK BIT (502) |
|---|---|
| Surprise Down Error | 1 |
| Data Link Protocol Error | 0 |
| Poisoned TLP | 0 |
| Flow Control Protocol Error | 0 |
| Completion Timeout | 0 |
| Completer Abort | 0 |
| Unexpected Completion | 0 |
| Receiver Overflow | 0 |
| Malformed TLP | 0 |
| ECRC Error | 0 |
| Unsupported Request | 1 |
| ACS Violation Error | 0 |
| Uncorrectable Internal Error | 0 |
| MC Blocked TLP | 0 |
| AtomicOp Egress Blocked | 0 |
| TLP Prefix Blocker | 0 |

FIG. 5

MONITORING INFORMATION 130

| LOCATION NAME | LOCATION NUMBER | ERROR OCCURRENCE TIME | VALID BIT | POLLING BIT |
|---|---|---|---|---|
| IO I/F_1 | 111 | 2014/12/23/11:50:23.241 | 1 | 1 |
| IO I/F_2 | 112 | 0 | 0 | 0 |
| ... | ... | ... | ... | ... |
| PCI SW_1 PORT_1 | 211 | 0 | 0 | 1 |
| PCI SW_1 PORT_2 | 212 | 0 | 0 | 1 |
| ... | ... | ... | ... | ... |

*FIG. 6*

COMPUTER SYSTEM AND ERROR ISOLATION METHOD

CROSS-REFERENCE TO RELATED APPLICATIONS

This application is a U.S. National Stage entry of PCT Application No. PCT/JP2015/069626, filed on Jul. 8, 2015, the entire contents of which are hereby incorporated by reference.

BACKGROUND OF THE INVENTION

This invention relates to technology of an error processing in a computer system.

In recent years, vertically integrated systems have drawn attention. A vertically integrated system is composed of hardware such as a storage apparatus, a server apparatus, and a network apparatus, software such as a data base, an application, and a middleware, and a tool for unifying the management thereof.

As to a vertically integrated system, a vendor providing services and apparatuses builds a system suitable for the business needs of the user and provides the system to the user. The user can quickly procure an optimum system for the business when they need and operate the system immediately.

The vertically integrated system can employ a configuration where the server apparatus is steadily connected with the storage apparatus to achieve high I/O performance. In such the configuration, a plurality of computers are connected with devices capable of high-speed data communication by PCI Express (hereinafter, PCIe), and like. For example, the server apparatus and the storage apparatus are connected via an I/O device which is PCIe compliant.

In some systems having the above-described configuration, the power supply unit for supplying power to the device is different from the power supplies for supplying power to the apparatuses. In a case where the power supply unit for the device is stopped in the system with such the configuration, the server apparatus or the storage apparatus detects it as an error of the device (hardware error).

For example, in a case where a graphical processing unit (GPU) to be driven by external power is connected to the server apparatus, the power supply unit for the server apparatus is different from the power supply unit for the GPU. In another case where the server apparatus and the storage apparatus are connected via a non-transparent bridge (NTB) device which is PCIe compliant and the NTB device is driven by the power supplied by the power supply unit for the server apparatus, the power supply unit for the storage apparatus is different from the power supply unit for the NTB device.

In a system where the server apparatus and the storage apparatus are connected via the NTB device, the PCIe link is disconnected in a case where the power supply unit for the server apparatus is stopped as scheduled. The storage apparatus detects it as an error of the NTB device and performs predetermined error processing. As a result, processing to block the NTB device is performed or an instruction to replace the NTB device is issued. Usually, in a case where the processing to block the NTB device has been performed, the NTB device is not used until the NTB device is replaced by a new one.

However, the disconnection of the PCIe link is caused by the stop of the power supply unit of the server apparatus and no error occurs in the NTB device. Accordingly, in a case where the power supply unit of the server apparatus is reactivated, the existing NTB device needs to be used automatically without replacement with a new one. In other words, in a case where the power supply unit supplying the power to the NTB device stops, it is necessary to prevent the server apparatus or the storage apparatus from detecting it as an error of the NTB device.

To solve the foregoing problem, a traditional technique hot-removes the NTB device from the server apparatus or the storage apparatus before stopping the power unit of the server apparatus. This technique requires operations to hot-remove the NTB device from the storage apparatus before operations to stop the power supply unit of the server apparatus. Teaching the user or the maintenance person the procedure and making them strictly follow the procedure are difficult; there is a possibility of false operation.

Another problem arises that, if an error occurs in the power supply unit of the server apparatus, the storage apparatus may wrongly detect it as a hardware error of the NTB device.

Accordingly, in a case of stopping of the power to the NTB device before the hot-remove operations are performed on the storage apparatus, it is necessary to prevent the storage apparatus from detecting it as an error of the NTB device.

U.S. Pat. No. 8,140,922 B discloses a method of sending detailed information on an error to the connected server apparatus or storage apparatus when the error occurs.

SUMMARY OF THE INVENTION

When using the method according to U.S. Pat. No. 8,140,922 B, in a case where a port connected with the NTB device detects stop of the power to the NTB device, the port is able to send information on the error to the server apparatus or the storage apparatus.

However, the method according to U.S. Pat. No. 8,140,922 B requires the server apparatus or the storage apparatus to have an additional function for receiving the information on the error. Furthermore, U.S. Pat. No. 8,140,922 B does not disclose a method of detecting stop of the power to the NTB device and specific processing of the server apparatus or the storage apparatus after receiving the information on the stop of the power.

This invention provides an apparatus and a method for isolating an error caused by stop of the power supply unit of a device connected with a computer from the other errors in a system in which the power supply unit for the computer and the power supply unit for the device are separate.

The present invention can be appreciated by the description which follows in conjunction with the following figures, wherein: a computer system comprises a plurality of computers, each of the plurality of computers includes a processor, a memory coupled to the processor, and a device interface coupled to the processor. At least one of the plurality of computers is coupled to at least one device configured to couple to other computers via the device interface. The computer system further comprises a first power supply configured to supply electric power to the plurality of computers and a second power supply configured to supply electric power to the at least one device. The at least one of the plurality of computers including an error isolation unit configured to periodically obtain values of an error status register holding information on errors occurring in the at least one device and a link status register holding information on a status of a link coupling the at least one of the plurality of computers and the at least one device and determine whether an error occurring in the at least one device is to be isolated. The device interface including the error status register and the link status register. The error isolation unit being configured to: determine whether an error occurs in the at least one device based on the error status register; determine whether the error occurring in the at least one device is an error to be isolated based on the error status register and the link status register; determine whether the error occurring in the at least one device is an error to be isolated based on values of the error status register and the link status register re-obtained after elapse of a predetermined time in a case where it is determined that the error occurring in the at least one device is not to be isolated; and detect the error occurring in the at least one device as an error of a protocol caused by stop of the second power supply in a case where it is determined that the error occurring in the at least one device is to be isolated.

According to this invention, the computer is able to isolate an error caused by stop of the power supply unit of the device. Problems, configurations, and effects other than described above will become apparent from a description of an embodiment below.

BRIEF DESCRIPTION OF THE DRAWINGS

The present invention can be appreciated by the description which follows in conjunction with the following figures, wherein:

FIG. 4 is an explanatory diagram for illustrating an example of an error status register in Embodiment 1, FIG. 5 is an explanatory diagram for illustrating an example of an error mask register in Embodiment 1, FIG. 6 is an explanatory diagram for illustrating an example of monitoring information in Embodiment 1.

DETAILED DESCRIPTION OF THE EMBODIMENTS

Hereinafter, embodiments of this invention are described in detail based on the drawings.

Embodiment 1

Figure 1:
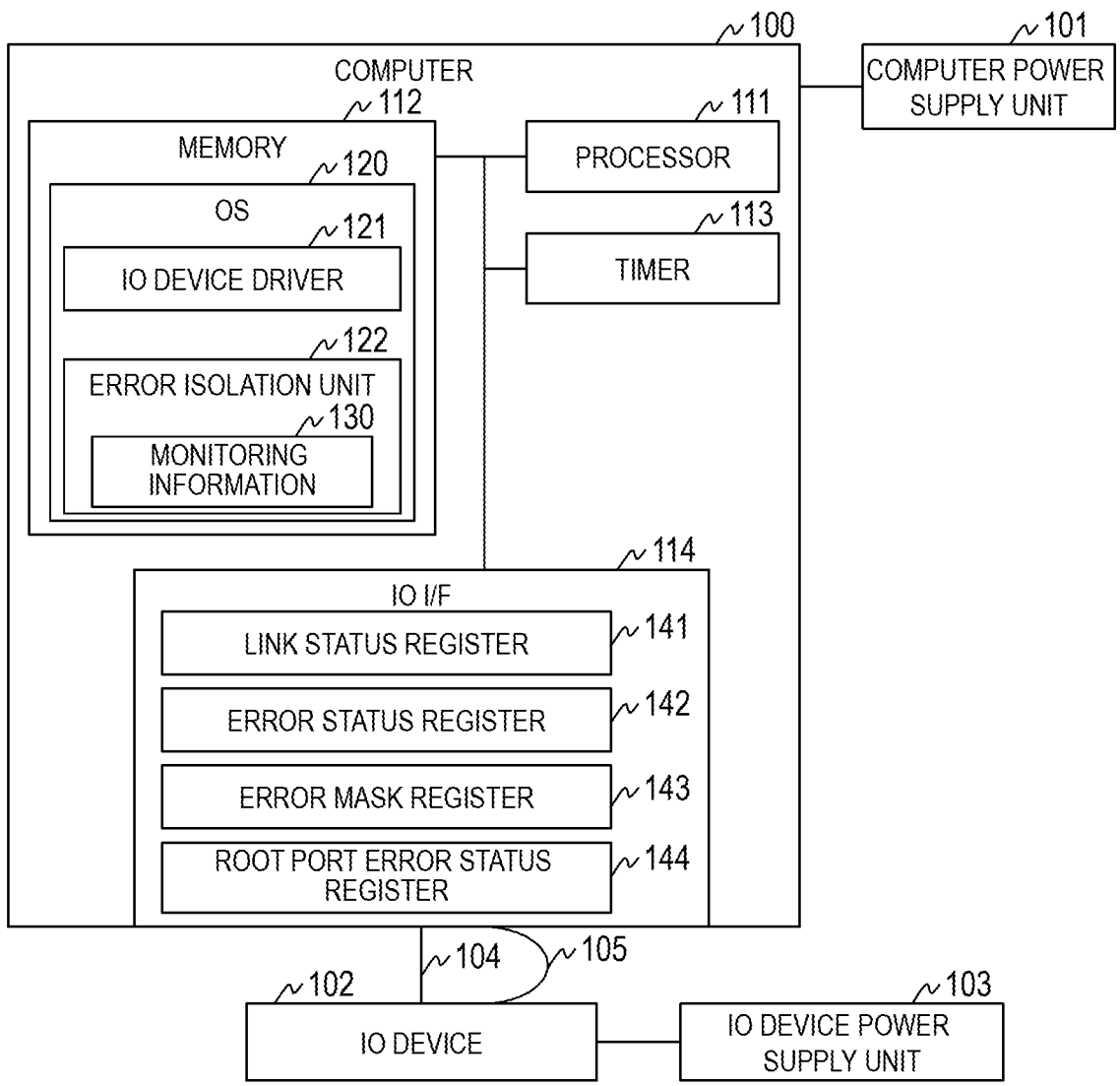
FIG. 1 is a block diagram for illustrating an example of the configuration of a computer system in Embodiment 1.

FIG. 1 is a block diagram for illustrating an example of the configuration of a computer system in Embodiment 1.

The computer system includes one or more computers 100. Assume that the computer system in this embodiment includes one computer 100. The computer 100 is connected with one or more IO devices 102. The computer 100 connects to other apparatuses via the IO devices 102.

The computer 100 has a processor 111, a memory 112, a timer 113, and an IO I/F 114. The computer 100 is connected with a computer power supply unit 101 for supplying power to the computer 100. The computer 100 uses the power supplied from the computer power supply unit 101 to operate.

The processor 111 includes one or more computing cores to execute programs stored in the memory 112. Function of the computer 100 can be implemented by the processor 111 executing the programs. Hereinafter, when processing is described using a program as an agent, it means that the program is being executed by the processor 111. The timer 113 manages the time. The timer 113 may manage the time in the computer 100 or the time in the entire computer system.

The memory 112 stores programs to be executed by the processor 111 and information necessary to execute the programs. The memory 112 in this embodiment stores a program for implementing an OS 120. The OS 120 is software for controlling the overall computer 100 and includes an IO device driver 121 and an error isolation unit 122. The OS 120 includes not-shown other function units.

The IO device driver 121 controls the IO devices 102 connected via the IO I/F 114. The error isolation unit 122 categorizes an error occurring in the computer 100 or an IO device 102 by factor and determines how to address the error depending on the factor.

The error isolation unit 122 includes monitoring information 130. The monitoring information 130 is information for managing the statuses of the devices inclusive of a device in which an error occurs.

The IO I/F 114 is an interface for connecting the computer 100 to other apparatuses. The IO devices 102 and switches are connected to the IO I/F 114. In Embodiment 1, the computer 100 is directly connected with the I/O devices 102 via the IO I/F 114. The IO I/F 114 can be a PCIe compliant interface. In such a case, the IO I/F 114 corresponds to a root complex and a root port.

The computer 100 and an IO device 102 are connected by a main path 104 and a redundant path 105 for a sideband like Inter-Integrated Circuit (I2C) or a hotline. In this embodiment, a link such as a PCIe link is established on the main path 104. The redundant path is used by the I/O device to send a blocking request in a case where an error occurs and the link is disconnected.

The IO I/T 114 has link status registers 141, error status registers 142, an error flask register 143, and a Root Port error status register 144.

Each link status register 141 is a register for managing the status of a link. The details of the link status register 141 will be described later with FIG. 2. Each error status register 142 is a register for managing descriptions (names) of a plurality of errors and whether each of the errors occurs. The details of the error status register 142 will be described later with FIG. 4.

The error mask register 143 is a register for managing whether a mask is set for the interruption to notify the processor 111 of an error. The details of the error mask register 143 will be described later with FIG. 5. The Root Port error status register 144 is a register for locating the device in error among the devices directly or indirectly connected via the IO I/F 114. The details of the Root Port error status register 144 will be described later with FIG. 3.

The IO devices 102 are connected with an I/O device power supply unit 103 for supplying power to the IO devices 102. Each IO device 102 uses the power supplied by the I/O device power supply unit 103 to operate.

Now, the outline of this invention is described. Traditionally, if the IO device power supply unit 103 in a computer system shown in FIG. 1 stops when the computer 100 is in operation, the computer 100 determines that it is an error in each IO device 102.

In Embodiment 1, the processor 111 of the computer 100 checks details of an error that occurs at a predetermined time in a case where the IO device power supply unit 103 has stopped and determines whether there is a possibility that the IO device power supply unit 103 has stopped, based on the details of the error. In a case where it is determined that there is a possibility that the IO device power supply unit 103 has stopped, the processor 111 controls the computer 100 not to treat the error as an error of the IO device 102. In the following description, the error that can occur in a case where the IO device power supply unit 103 has stopped is referred to as device power error.

To achieve this control, the IO I/F 114 of the computer 100 detects the device power error upon occurrence thereof, but masks an interruption to notify the processor 111 of the device power error. In this case, the processor 111 detects the device power error by polling. On the other hand, for an error other than the device power error, the IO I/F 114 does not mask an interruption to notify the processor 111 of the error and generates the interruption. Then, the processor 111 detects the error by the interruption.

In other words, in case where an error other than the device power error occurs, the processor 111 detects the error by interruption; in case where the device power error occurs, the processor detects the error by polling.

In a case of detecting of the device power error by polling, the processor 111 checks the details of the error. In a case where the device power error occurs, the link goes down without exception. Accordingly, in a case where a link-down error occurs or in a case where the link is down, the processor 111 in this embodiment does not detect the error as an error of the IO device 102. Even if another error exists that can occur with the stop of the IO device power supply unit 103 at the same time, the processor 111 in this embodiment does not detect the error as an error of the IO device 102.

It takes time for a device (hardware) such as the IO I/F 114 and like to find a link down. Accordingly, another device power error different from the link-down error may occur before the device (hardware) finds the link down. For this reason, the processor 111 performs polling again after elapse of a certain time, in a case where the processor 111 has detected the device power error. If the result shows that a link-down error occurs or the link is down, the processor 111 controls the computer 100 not to detect the incident as an error of the IO device 102. However, even if the processor 111 does not detect the incident as an error of the IO device 102, the link is in the status of link down; accordingly, the processor 111 detects the incident as a link-down error in the level of the protocol such as Fibre Channel or Ethernet.

In a case where an error actually occurs in the IO device 102, it is in the link down state. However, the above-described control may not be able to detect the incident as an error of the IO device 102. The processor 111 in this embodiment is therefore configured to receive error information or a blocking request from the IO device 102 via the redundant path 105. Then, the processor 111 can block the IO device 102 in error.

Figure 2:
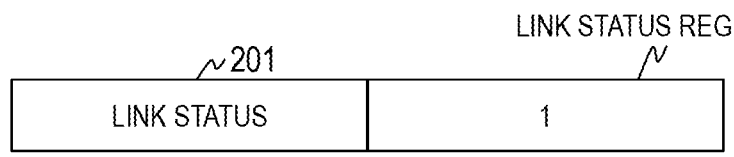
FIG. 2 is an explanatory diagram for illustrating an example of a lit status register in Embodiment 1.

FIG. 2 is an explanatory diagram for illustrating an example of the link status register 141 in Embodiment 1.

The link status register 141 holds a value indicating the link status 201. When the value of the link status 201 is "1", it indicates that the link is state of link up; when the value of the link status 201 is "0", it indicates that the link is state of link down.

If the IO device 102 is a PCIe compliant device, the Data Link Layer Link Active bit in the Link Status register can be used as the link status register 141.

Figure 3:
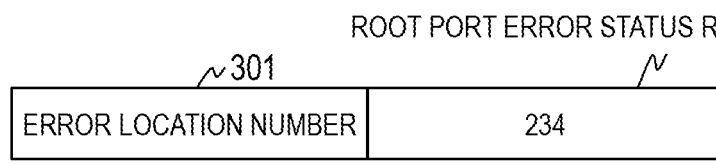
FIG. 3 is an explanatory diagram for illustrating an example of a Root Port error status register in Embodiment 1.

FIG. 3 is an explanatory diagram for illustrating an example of the Root Port error status register 144 in Embodiment 1.

The Root Port error status register 144 holds an error location number 301. The error location number 301 stores the identification number assigned to the location where an error occurs. If the IO device 102 is a PCIe compliant device, the bus number, the device number, and the function number according to the PCIe standard can be used as the identification number.

If the IO device 102 is a PCIe compliant device, the Header Log Register included in the Advanced Error Reporting Extended Capability can be used as the Root Port error status register 144.

FIG. 4 is an explanatory diagram for illustrating an example of the error status register 142 in Embodiment 1.

The error status register 142 includes a description of error 401 and an error occurrence bit 402. The description of error 401 stores information indicating the description or the type of an error. The error occurrence bit 401 stores a value indicating whether an error corresponding to the description of error 401 occurs. For example, in the case where "1" is stored, an error corresponding to the description of error 401 occurs; in the case where "0" is stored, an error corresponding to the description of error 401 does not occur.

If the IO device 102 is a PCIe compliant device, the Uncorrectable Error Status register included in the Advanced Error Reporting Extended Capability can be used as the error status resister 142.

In the example shown in FIG. 4, the error status register 142 includes "Surprise Down Error" or like, as the description of error 401. This "Surprise Down Error" is an error that occurs when the link is disconnected without a prior notification from the IO device 102 or like. In a case where a "Surprise Down Error" occurs, the error occurrence bit 402 corresponding to the "Surprise Down Error" is updated from "0" to "1".

FIG. 5 is an explanatory diagram for illustrating an example of the error mask register 143 in Embodiment 1.

The error mask register 143 includes a description of error 501 and an error notification mask bit 502. The description of error 501 is identical to the description of error 401. The error notification mask bit 501 stores a value indicating whether the IO I/F 114 should notify the processor 111 of an error corresponding to the description of error 501 upon occurrence thereof.

For example, in the case where "0" is stored, it indicates that the error will be notified to the processor 111 using interruption; in the case where "1" is stored, it indicates that the error will be not notified to the processor 111. In other words, when "1" is stored in the error notification mask bit 502, the interruption for notifying the processor 111 of the error is masked.

If the IO device 102 is a PCIe compliant device, the Uncorrectable Error Mask register included in the Advanced Error Reporting Extended Capability can be used as the error mask register 143.

In the example shown in FIG. 5, the error mask register 143 includes "Surprise Down Error" or like, as a description of error 501. In a case where the "Surprise Down Error" occurs and the value of the error notification mask bit 502 corresponding to the "Surprise Down Error" is "0", the IO I/F 114 notifies the processor 111 of the error by issuing an interruption. In a case where the "Surprise Down Error" occurs and the value of the error notification mask bit 502 corresponding to the "Surprise Down Error" is "1", the IO I/F 114 does not notify the processor 111 of the error.

It should be noted that, when any error like the "Surprise Down Error" occurs, a value "1" is stored in the error occurrence bit 402 in either case where the value of the error notification mask bit 502 is "1" or "0".

FIG. 6 is an explanatory diagram for illustrating an example of the monitoring information 130 in Embodiment 1.

The monitoring information 130 includes a location name 601, a location number 602, an error occurrence time 603, a valid bit 604, and a polling bit 605.

The location name 601 stores the name of a device. For example, the location name 601 stores the name of the IO I/F 114 and like, or the name of a switch, the name of a downlink port of the switch, and like. The location number 602 stores an identification number assigned to a device. Identification numbers to be stored in the location numbers 602 are in common with the identification numbers to be stored to the error location number 301. As an option, the monitoring information 130 may include only at least either the location names 601 or the location numbers 602.

The error occurrence time 603 stores time at which the processor 111 detects an error in a device corresponding to the location name 601 by polling. The error occurrence time 603 for the location from which no error is detected stores "0". The valid bit 604 stores a value indicating whether the value of the error occurrence time 603 is valid. For example, if the value of the valid bit 604 in a given row is "1", it indicates that the time stored in the error occurrence time 603 in the row is valid; if the value of the valid bit 604 is "0", it indicates that the time stored in the error occurrence time 603 in the row is invalid.

The polling bit 605 stores a value indicating whether the processor 111 should poll the values of the errors setting mask among errors included in the error status register 142 which is held by a device corresponding to the location name 601. For example, if the polling bit 605 in a given row stores "1", the processor 111 polls the error status register 142 held by a device corresponding to the row and performs error isolation processing based on the retrieved values. On the other hand, if the polling bit 605 in a given row stores "0", the processor 111 does not perform polling to a device corresponding to the row.

For example, a blocked device (port, for example), it is not necessary to detect error and therefore, "0" is stored in the polling bit 605. Also, a device (port, for example) on which all errors are notified of by interruption, it is not necessary to perform polling and therefore, "0" is stored in the polling bit 605.

Next, specific operations of the computer system are described with FIGS. 7 to 10.

Figure 7:
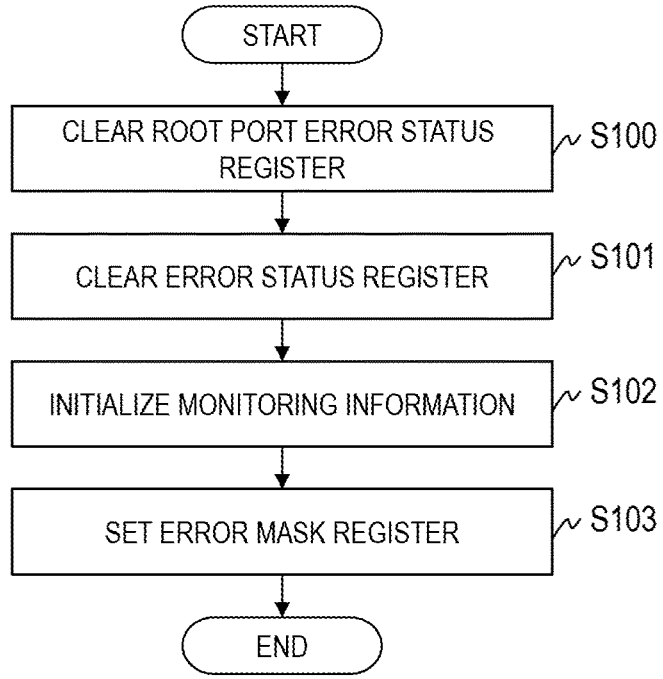
FIG. 7 is a flowchart of an example of initialization processing to be performed by a computer in Embodiment 1.

FIG. 7 is a flowchart of an example of initialization processing to be performed by the computer 100 in Embodiment 1.

The initialization processing is performed in a case of constructing the computer system or adding a new IO device 102 to the computer system. The initialization processing is executed by the IO device driver 121 or the error isolation unit 122 included in the OS 120. The following description is based on assumption that the error isolation unit 122 executes the initialization processing.

For the initialization processing, first policy information for setting masks and second policy information for setting the devices to be performed polling are input. The first policy information includes information on the errors to be masked and the like, and the second policy information includes identification information of the devices to be performed polling and the like. The first policy information and the second policy information can be stored beforehand in the memory 112 or an external storage device.

The error isolation unit 122 clears the value of the error location number 301 in the Root Port error status register 144 included in the IO I/F 114 (Step S100). Next, the error isolation unit 122 clears the value of the error status register 142 included in the IO I/F 114 (Step S101). Specifically, the error isolation unit 122 sets "0" to the error occurrence bits 402 in all rows of the error status register. If the computer 100 has a plurality of IO I/Fs 114, the same processing is performed on all the IO I/Fs 114.

Next, the error isolation unit 122 initializes the monitoring information 130 (Step S102). Specifically, the following processing is performed.

The error isolation unit 122 determines whether monitoring information 130 exists. The processing is partially different depending on whether monitoring information 130 exists. First, the processing in the case of determination that the monitoring information 130 does not exist is described.

The error isolation unit 122 obtains information on all devices connected with the computer 100 from the IO I/F 114. The error isolation unit 122 generates monitoring information 130 and adds as many rows as the number of the obtained devices. The error isolation unit 122 sets the values obtained from the IO I/F 114 to the location name 601 and the location number 602 of each row.

For example, if the IO devices 102 is a PCIe compliant device, a device tree whose root complex is the IO I/F 114 is generated by the OS 120 in a case where the computer 100 and the IO devices 102 are powered on. The error isolation unit 122 obtains the information on the device tree to generate the monitoring information 130.

The error isolation unit 122 sets "0" to the error occurrence time 603 and the valid bit 604 of each row. The error isolation unit 122 further sets a value to the polling bit 605 of each row based on the second policy information.

In a case of determining that monitoring information 130 exists, the following processing is performed. First, the error isolation unit 122 determines whether a new IO device 102 has been added. In a case where a new IO device 102 has been added, the error isolation unit 122 adds a new row in the monitoring information 130 and sets values to the location name 601 and the location number 602 in the added row.

The error isolation unit 122 further sets "0" to the error occurrence time 603 and the valid bit 604 in the added row, and sets a value to the polling bit 605 in the added row based on the second policy information.

The foregoing is the processing of Step S102.

Next, the error isolation unit 122 initializes the error mask register 143 (Step S103) and terminates the initialization processing. Specifically, the error isolation unit 122 sets a value to the mask bit 502 for each description of error 501 in the error mask register 143 based on the first policy information.

According to the first policy information in Embodiment 1, a mask is set to the device power error and no masks are set to the errors other than the device power error.

Setting a mask as described above leads to controlling the computer 100 to periodically perform polling and if the device power error occurs, not to treat the device power error as an error of the IO device 102. if an error other than the device power error occurs, the computer 100 detects the error by interruption and addresses the detected error.

For example, the "Surprise Down Error" occurs when the link between the computer 100 and an IO device 102 is disconnected because of stop of the IO device power supply unit 103. Accordingly, the error notification mask bit 502 of a row corresponding to the "Surprise Down Error" is set to "1". A "Malformed TLP" is an error that occurs when the format of a packet is incorrect and therefore, it is not considered as an error caused by stop of the IO device power unit 103. Accordingly, the error notification mask bit 502 of a row corresponding to the "Malformed TLP" is set to "0".

In the case where the computer 100 has a plurality of IO I/Fs 114, Steps S100 to S103 are performed on all of the IO I/Fs 114.

Figure 8:
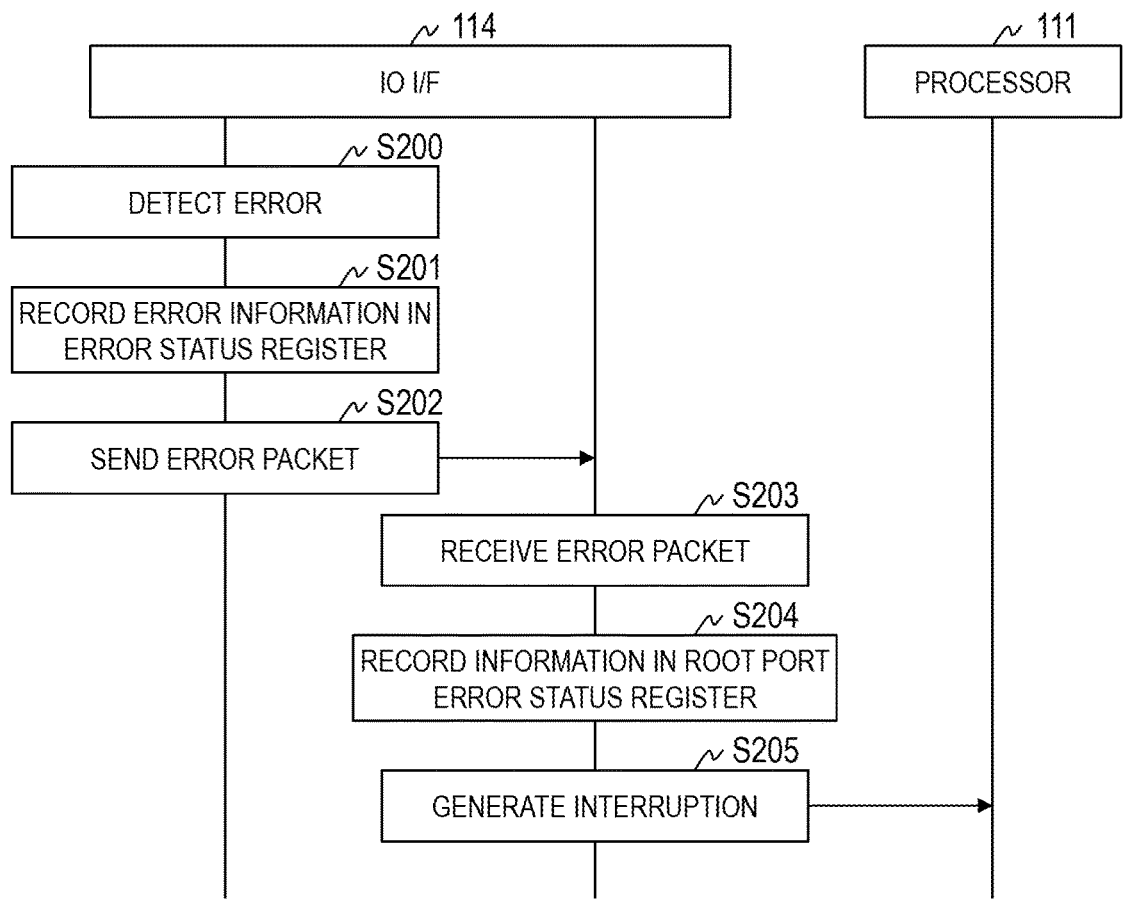
FIGS. 8 and 9 are sequence diagrams for illustrating the processing to be performed in a case where an error is detected in the computer system in Embodiment 1.
Figure 9:
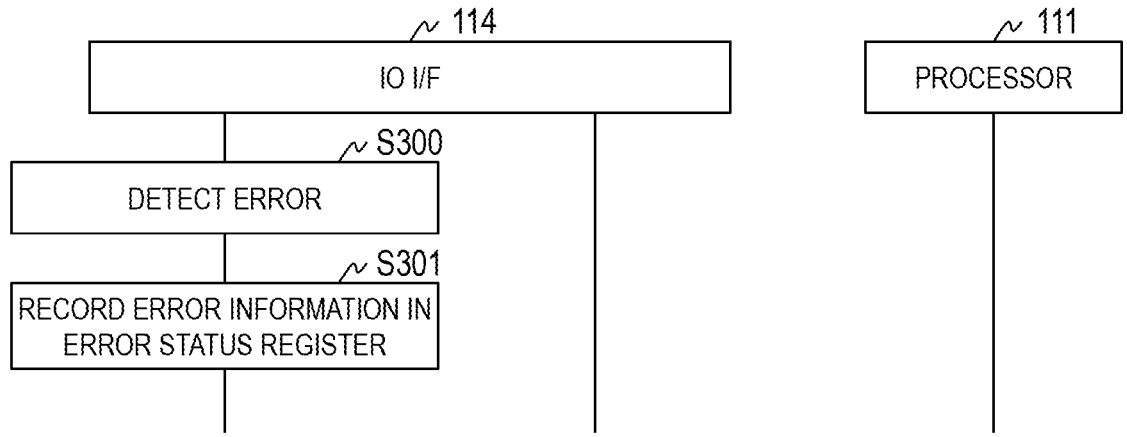

FIGS. 8 and 9 are sequence diagrams for illustrating the processing to be performed in a case where an error is detected in the computer system in Embodiment 1.

FIG. 8 illustrates the processing in a case where an error other than the device power error is detected. FIG. 9 illustrates the processing in a case where the device power error is detected.

The processing of FIG. 8 is described first. Assume that, in FIG. 8, the IO I/F 114 detects an error (an error other than the device power error) about an IO device 102. The IO I/F 114 detects an error other than the device power error (Step S200).

The IO I/F 114 records the occurred error in the error status register 142 (Step S201). Specifically, the IO I/F 114 searches for a row included in the error status register 142 whose the description of error 401 matches the detected error and sets "1" to the error occurrence bit 402 in the retrieved row. At this time, the IO I/F 114 refers the error mask register 143 to obtain the value of the error notification mask bit 502 correspond to the detected error, and determines whether the detected error is the device power error. In this example, the IO I/F 114 determines that the detected error is an error other than the device power error.

Next, the IO I/F 114 generates an error packet for notifying the error and sends the error packet to the IO I/F 114 itself (Step S202). At this step, the IO I/F 114 performs pseudo the error packet transmission internally. The error packet includes information such as the identification number of the device where the error has occurred, the description of the error, the identification number of the device that has detected the error, and like. For example, in the case where an IO device 102 has detected the error, the error packet includes the identification number assigned to the IO device 102.

Next, the IO I/F 114 receives the error packet (Step S203) and records the information on the device where the error occurs in the Root Port error status register 144 (Step S204). Specifically, the IO I/F 114 sets the identification number of the device included in the error packet to the error location number 301 in the Root Port error status register 144.

Next, the IO I/F 114 generates an interruption for the processor 111 (Step S205) and issues the interruption to the processor. As a result, the processor 111 can detect the error and perform processing to address the error.

In the case where the IO device 102 itself detects an error about the IO device 102, the IO device 102 performs Steps S200 and S202. The I/O device 402 may also perform Step S201.

Next, the processing of FIG. 9 is described. Assume that, in FIG. 9, the IO I/F 114 detects an error (the device power error) about an IO device 102. The IO I/F 114 detects the device power error (Step S300). The IO I/F 114 records the error in the error status register 142 (Step S301). Steps S300 and S301 are the same as Steps S200 and S201.

At Step S301, the IO I/F 114 refers the error mask register 143 to obtain the value of the error notification mask bit 502 correspond to the detected error, and determines whether the detected error is the device power error. In this example, the IO I/F 114 determines that the detected is the device power error. Accordingly, the IO I/F 114 terminates the processing without generating an error packet.

In the case where the IO device 102 itself detects the error about the IO device 102, the IO device 102 may perform Step S301.

As described above, an interruption to the processor 111 is not generated for the device power error. Accordingly, the processor 111 does not detect the device power error as an error of the IO device 102 at the time of occurrence thereof. The processor 111 detects the device power error by polling the IO I/F 114 for the error status register 142.

In either case where the device power error or an error other than the device power error occurs, "1" is stored to the error occurrence bit 402 in the error status register 152 as illustrated in FIGS. 8 and 9.

Figure 10:
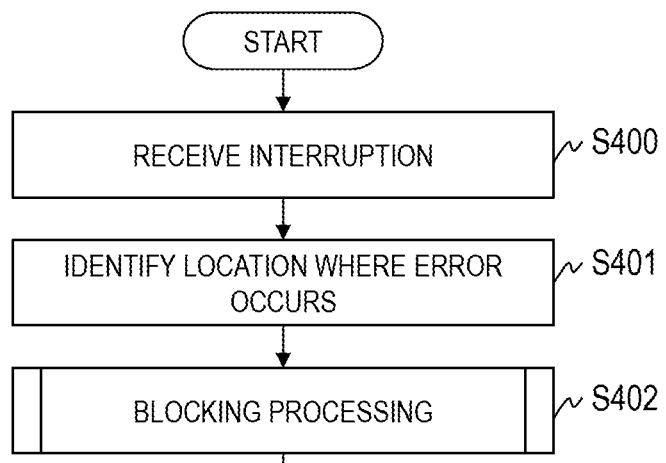
FIG. 10 is a flowchart of an example of the processing to be performed by a processor of the computer in Embodiment 1 in a case of receiving an interruption.

FIG. 10 is a flowchart of an example of the processing to be performed by the processor 111 of the computer 100 in Embodiment 1 in a case of receiving an interruption.

In the configuration of Embodiment 1, an interruption is to be made for any error other than the device power error. When any error other than the device power occurs, there is no possibility that the IO device power supply 103 is stopped. Accordingly, common blocking processing is performed on the IO device 102 to address an error other than the device power error.

In a case of receiving an interruption from the IO I/F 114 (Step S400), the processor 111 starts error processing. First, the processor 111 reads the value of the Root Port error status register 144 to identify the location where an error occurs (Step S401). The processor 111 performs blocking processing onto the identified location (Step S402) and terminate the processing. The details of the blocking processing will be described with FIG. 12.

Figure 11:
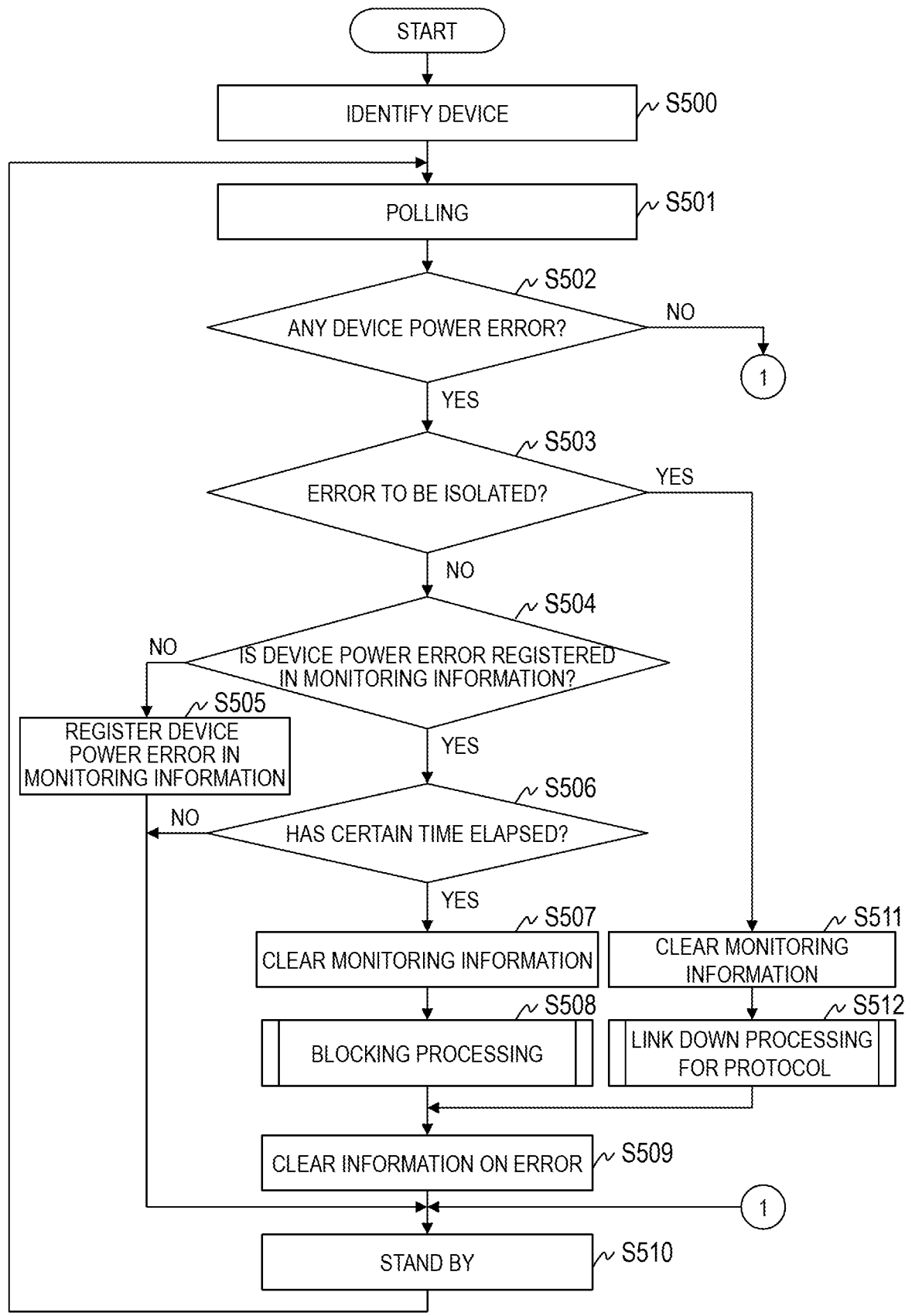
FIG. 11 is a flowchart of an example of polling processing to be performed by the processor of the computer in Embodiment 1.

FIG. 11 is a flowchart of an example of polling processing to be performed by the processor 111 of the computer 100 in Embodiment 1. The processor 111 executing the error isolation unit 122 starts the following processing in a case where the computer power supply unit 101 is powered on or the processor 111 receives an instruction from the operator and like.

The error isolation unit 122 refers to the polling bits 605 included in the monitoring information 130 to identify the devices to be performed polling (Step S500). In this example, assume that only the IO I/F 114 is to be performed polling.

Next, the error isolation unit 122 performs polling to the determined device (Step S501). Specifically, the error isolation unit 122 reads the values of the link status registers 141 and the error status register 142 held by the IO I/F 114. If failing in the polling the identified device, the error isolation unit 122 generates an interruption for the processor 111. In this case, the processor 111 performs processing to address the error.

Next, the error isolation unit 122 determines whether the device power error occurs based on the read value of the error status register 142 (Step S502). Specifically, the error isolation unit 122 determines whether any row setting a value "1" in the error occurrence bit 402 exists. In a case where there exists a row setting a value "1" in the error occurrence bit 402, the error isolation unit 122 determines that the device power error occurs.

In a case of determining that the device power error does not occur, the error isolation unit 122 proceeds to Step S510.

In a case of determining that the device power error occurs, the error isolation unit 122 determines whether the device power error is to be isolated (Step S503). Specifically, the error isolation unit 122 performs the following processing.

The error isolation unit 122 determines whether the occurring device power error is the "Surprise Down Error" based on the value of the error status register 142. In a case of determining that the occurring device power error is the "Surprise Down Error", the error isolation unit 122 determines that the occurring device power error is to be isolated.

In a case of determining that the occurring device power error is not the "Surprise Down Error", the error isolation unit 122 determines whether state of a link connected to the IO device 102 occurring the device power error is state of link down, based on the value of the link status register 141.

In a case of determining that the link connected to the IO device 102 occurring the device power error is state of link down, the error isolation unit 122 determines that the device power error is to be isolated. The foregoing is the description of the processing of Step S503.

In a case of determining that the device power error is not to be isolated, the error isolation unit 122 determines whether the device power error is registered in the monitoring information 130 as a valid device power error (Step S504). Specifically, the error isolation unit 122 searches a row corresponding to the device occurring the device power error based on the location name 601 and the location number 602 included in the monitoring information 130. The error isolation unit 122 determines whether the valid bit 604 included in the retrieved row is set "1". In a case where the valid bit 604 sets "0", the error isolation unit 122 does not determine that the device power error is registered in the monitoring information 130 as a valid device power error.

In a case of determining that the device power error is not registered in the monitoring information 130 as a valid device power error, the error isolation unit 122 registers the device power error to the monitoring information 130 (Step S505). Subsequently the error isolation unit 122 proceeds to Step S510. Specifically, the error isolation unit 122 sets "1" to the valid bit 604 included in the row retrieved at Step S504. The error isolation unit 122 further obtains the current time from the timer 113 and sets the obtained time to the error occurrence time 603.

In a case of determining that the device power error is registered in the monitoring information 130 as a valid device power error, the error isolation unit 122 determines whether a certain time has elapsed after the occurrence of the device power error (Step S506). Specifically, the error isolation unit 122 performs the following processing.

The error isolation unit 122 obtains the current time from the timer 113. The error isolation unit 122 also obtains the time of the error occurrence time 603 included in the row retrieved at Step S504. The error isolation unit 122 calculates the time that has elapsed after the occurrence of the error, using the current time and the time obtained from the error occurrence time 603.

The error isolation unit 122 determines whether the calculated time is longer than a predetermined period. The predetermined period can be changed by the operator as appropriate. In a case where the calculated time is longer than the predetermined period, the error isolation unit 122 determines that a certain time has elapsed after the occurrence of the error.

In a case of determining that a certain time has not elapsed, the error isolation unit 122 proceeds to Step S510 without detecting the device power error as an error of the IO device 102. In a case of determining that a certain time has elapsed, the error isolation unit 122 clears the information on the device power error registered in the monitoring information 130 (Step S507). Specifically, the error isolation unit 122 sets "0" to the error occurrence time 603 and the valid bit 604 in the row retrieved at Step S504. In this case, the error isolation unit 122 detects the device power error as an error of the IO device 102.

Next, the error isolation unit 122 performs blocking processing (Step S508). The details of the blocking processing will be described with FIG. 12. After completion of the blocking processing, the error isolation unit 122 clears the information on the error (Step S509) and thereafter, proceeds to Step S510. Specifically, the error isolation unit 122 clears the values set to the Root Port error status register 144 and the error status register 142 held by the IO I/F 114.

At Step S510, the error isolation unit 122 stands by for a certain period (Step S510). After elapse of a certain period, the error isolation unit 122 returns to Step S501 and repeats the same processing.

In a case of determining at Step S503 that the device power error is to be isolated, the error isolation unit 122 does not detect the error as an error of the IO device 102, but detects as a link-down error in the protocol level. The error isolation unit 122 clears the information on the device power error registered in the monitoring information 130 (Step S511). The processing at Step S511 is the same as the processing at Step S507.

Next, the error isolation unit 122 performs link down processing for protocol (Step S512). The details of the link down processing for protocol will be described later with FIG. 13. After completion of the link down processing for protocol, the error isolation unit 122 clears the information on the error (Step S509) and thereafter proceeds to Step S510.

The blocking processing and the link down processing for protocol may be performed by the IO device driver 121. In this case, the error isolation unit 122 instructs the IO device driver 121 to execute the processings.

As described above, the error isolation, unit 122, in a case of detecting the device power error, determines whether the device power error is to be isolated by polling. In a case where the device power error is not to be isolated, the error isolation unit 122 performs polling again after elapse of a certain period and determines whether the device power error is an error to be isolated based on the result of the polling.

The reason why the polling is performed for multiple times is that, in a case where the link is disconnected because of an error in the IO device 102, it takes time to detect the disconnection of the link and update the value of the link status register 141. Updating the value of the "Surprise Down Error" in the error status register 142 also takes time.

For example, if the IO device 102 is a PCIe compliant device, approximately 150 ms will be taken until the value of the link status register 141 or the error status register 142 is updated after the link between the IO device 102 and the computer 102 is disconnected. However, the computer 100 detects the error in the IO device 102 sooner than this time.

Accordingly, if the value of the link status register 141 or the error status register 142 is read before being updated, the error isolation unit 122 cannot isolate the error caused by the stop of the IO device power supply unit 103. For this reason, considering the time taken to update the value of the link status register 141 or the error status register 142, the error isolation unit 122 performs polling again when a certain time has elapsed after detection of the device power error to determine whether to isolate the device power error based on the result of the polling. Such control achieves correct isolation of the occurring device power error.

In a case where a link-down caused by an error of the IO device 102 or the "Surprise Down Error" occurs, the occurring device power error is an error caused by stop of the IO device power supply unit 103. Accordingly, the error isolation unit 122 detects the device power error as a link-down error in the protocol level. In other words, the device power error is not treated as an error in the IO device 102 (hardware).

In a case where an error comparable to the stop of the IO device power supply unit 103 occurs together with an error in the IO device 102, the computer 100 first performs link down processing for protocol. However, the error will not be eliminated. The computer 100 accepts a blocking request from the IO device 102. The details of the processing in response to a blocking request from the IO device 102 will be described later with FIG. 14.

Figure 12:
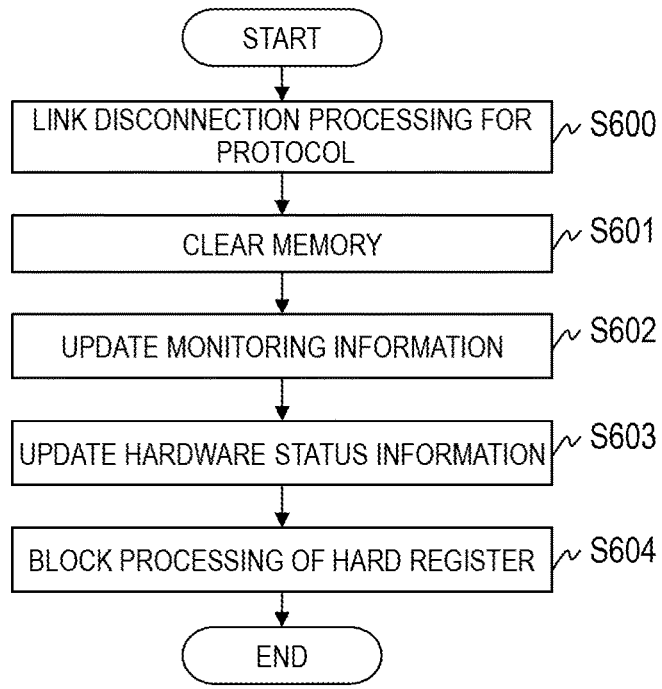
FIG. 12 is a flowchart of an example of blocking processing to be performed by an OS in Embodiment 1.

FIG. 12 is a flowchart of an example of the blocking processing to be performed by the OS 120 in Embodiment 1.

The OS 120 performs link disconnection processing for protocol (Step S600). At this step, the link disconnection processing for protocol is performed in accordance with the protocol such as Fibre Channel or Ethernet. The link disconnection processing for protocol is a well known processing; the explanation thereof is omitted here.

Next, the OS 120 clears the memory 112 (Step S601). For example, the OS 120 clears a storage area of the memory 112 used for queues to issue IOs to the external device through the IO device 102.

Next, the OS 120 updates the monitoring information 130 (Step S602). Specifically, the error isolation unit 122 changes the value of the polling bit 605 of the row corresponding to the device occurring the error included in the monitoring information 130 to "0". This operation reduces the number of devices to be performed polling and therefore, the load to the processor 111 caused by polling can be reduced.

Next, the OS 120 updates the hardware status information stored in the memory 112 (Step S603). Specifically, the OS 120 changes the status of the IO device 102 in the hardware status information held by the IO device driver 121 to the status of blocked. As a result, the computer 100 is controlled not to access the IO device 102.

Next, the OS 120 performs block processing of the hard register (Step S604) and terminates the processing. In this embodiment, the OS 120 sets "1" to the error notification mask bits 502 in all rows of the error mask register 143 held by the IO I/F 114, and clears the values of the error status register 142 and the Root Port error status register 144. The OS 120 further performs link disconnection processing.

Figure 13:
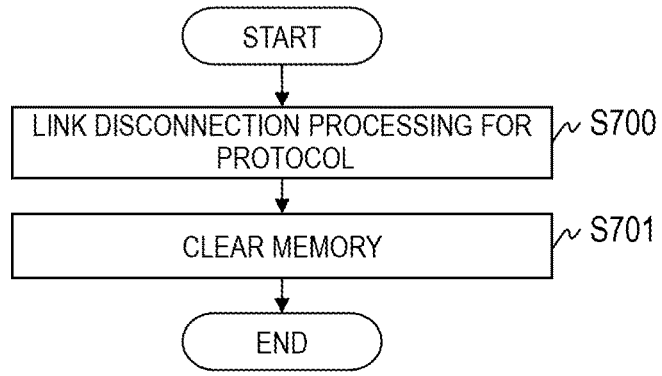
FIG. 13 is a flowchart of an example of link down processing for protocol to be performed by the OS in Embodiment 1.

FIG. 13 is a flowchart of an example of the link down processing for protocol to be performed by the OS 120 in Embodiment 1.

The OS performs link disconnection processing for protocol (Step S700) and clears the memory 112 (Step S701). Thereafter, the OS 120 terminates the processing. Step S700 is the same as Step S602. Step S701 is the same as Step S603.

In a case where the link down processing for protocol is performed, the IO device 102 itself is not blocked. Accordingly, the OS 120 can re-establish a link between the computer 100 and the IO device 102.

Figure 14:
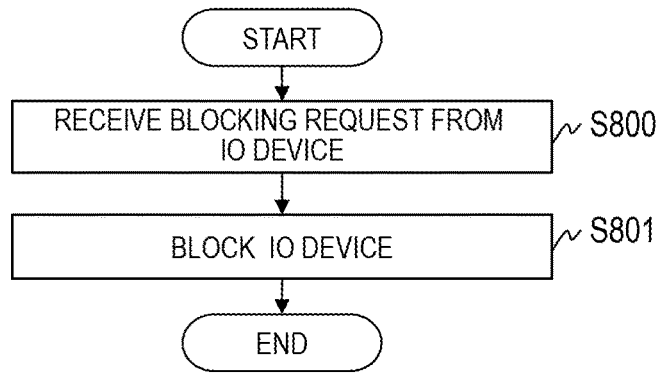
FIG. 14 is a flowchart of an example of processing to be performed by the OS in Embodiment 1 in a case of receiving a blocking request from an IO device.

FIG. 14 is a flowchart of an example of processing to be performed by the OS 120 in Embodiment 1 in a case of receiving a blocking request from an IO device 102.

The OS 120 receives a blocking request from an IO device 102 (Step S800). The OS 120 receives the blocking request from the IO device 102 via the redundant path 105.

The OS 120 performs processing to block the IO device 102 that has sent the blocking request (Step S801) and terminates the processing. The processing to block the IO device 102 is the same as the blocking processing in FIG. 12.

In Embodiment 1, a mask is set for the error that occurs in a case where the IO device power supply unit 103 stops. Accordingly, the error is not detected as an error of the IO device 102 in a case where such error occurs. Because the computer 100 detects the masked error by polling, and performs polling for a plurality of times, so it can correctly isolate the error caused the stop of the IO device power supply unit 103 from the other errors.

Embodiment 2

Embodiment 2 is partially different from Embodiment 1 in the configuration of the computer system. Hereinafter, Embodiment 2 is described mainly in the differences from Embodiment 1.

Figure 15:
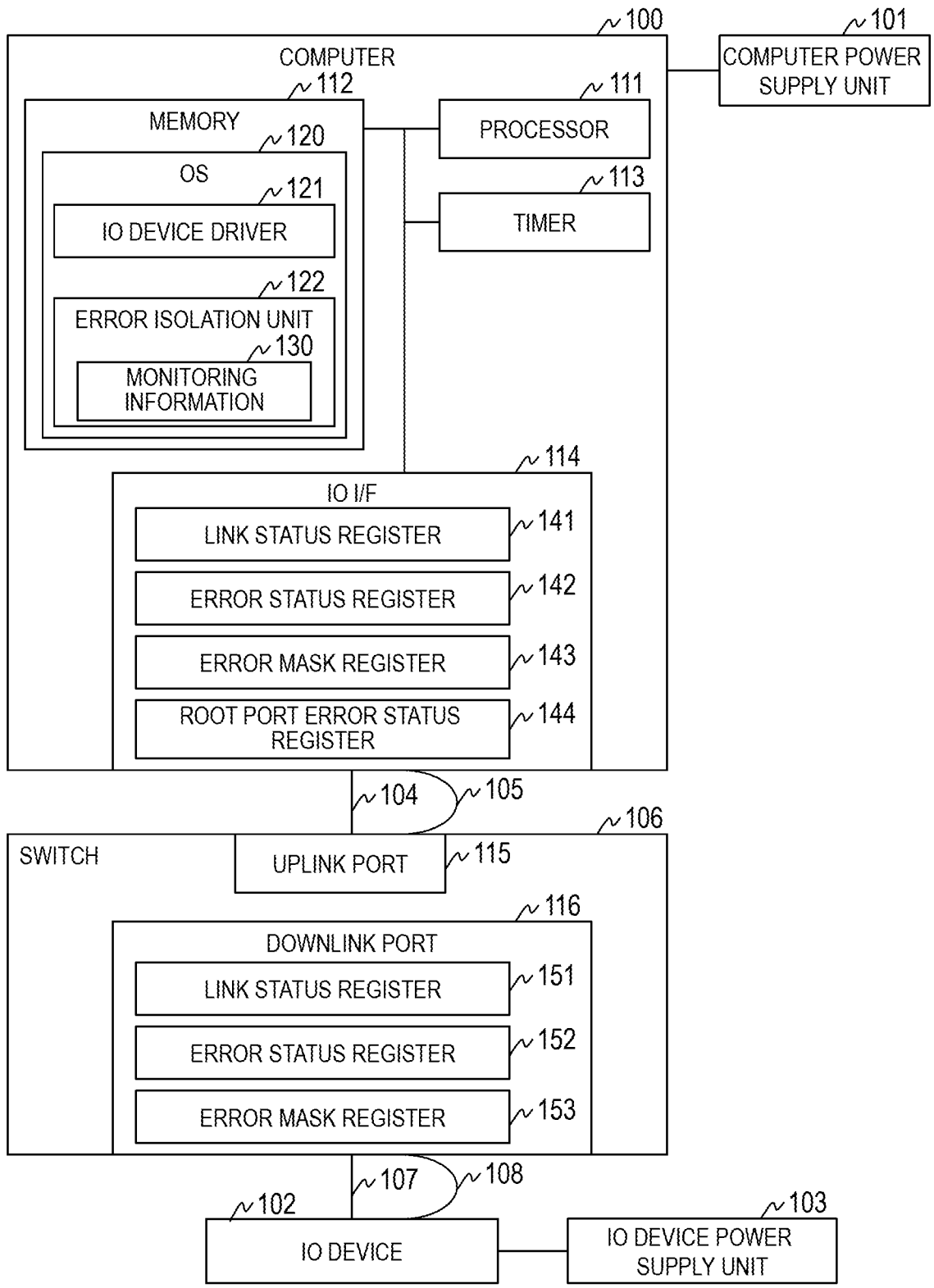
FIG. 15 is a block diagram for illustrating an example of the configuration of a computer system in Embodiment 2.

FIG. 15 is a block diagram for illustrating an example of the configuration of a computer system in Embodiment 2.

The computer system in Embodiment 2 is different from the one in Embodiment 1 in the point where the computer 100 is connected with the IO device 102 via a switch 106.

The computer 100, the IO device 102, the computer power supply unit 101, and the IO device power supply unit 103 are the same as those in Embodiment 1 and therefore, the descriptions thereof are omitted herein. The switch 106 is an apparatus for relaying data transmitted and received between apparatuses.

The computer 100 and the switch 106 are connected by a main path 104 and a redundant path 105; the switch 106 and the IO devices 102 are connected by a main path 107 and a redundant path 108.

The switch 106 includes at least one uplink port 115 and at least one downlink port 116. The switch 106 further includes not shown hardware such as a processor, a memory, and like.

The uplink port 115 is a port for connecting to a host apparatus. In this embodiment, at least one uplink port 115 is connected with the IO I/F 114 of the computer 100. The downlink port 115 is the port other than the uplink port 115 among the ports included in the switch 106. In this embodiment, at least one downlink port 116 is connected with the IO device 102.

Each downlink port 116 includes a link status register 151, an error status register 152, and an error mask register 153. The link status register 151, the error status register 152, and the error mask register 153 are the same as the link status register 141, the error status register 142, and the error mask register 143, respectively.

The initialization processing in Embodiment 2 is partially different from the initialization processing in Embodiment 1. Specifically, at Step S101, the error isolation unit 122 clears the values of the error status register 142 and the error status register 152. At Step S103, the error isolation unit 122 initializes the error mask register 143 and the error mask register 153. The rest of the processing is the same as the processing in Embodiment 1 and therefore the description thereof is omitted herein.

Figure 16:
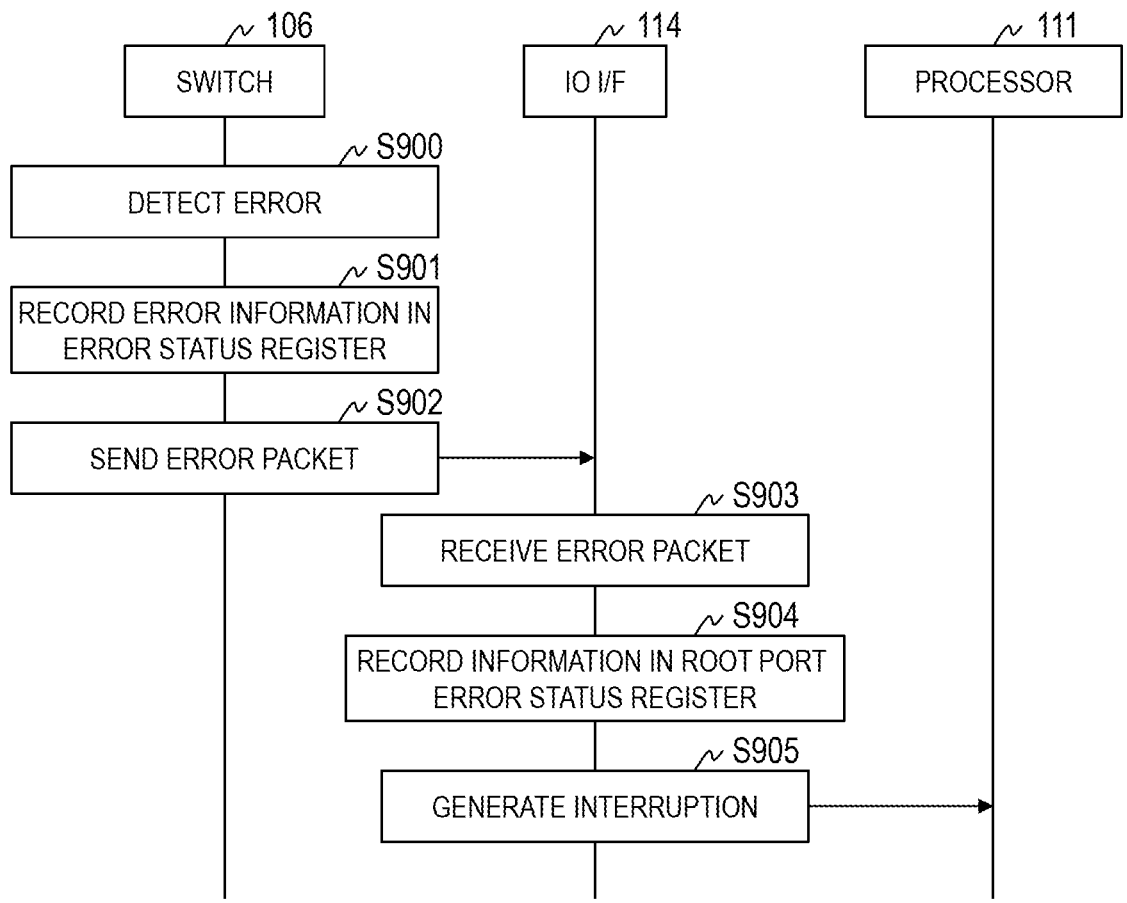
FIGS. 16 and 17 are sequence diagrams for illustrating the processing to be performed in a case where an error is detected in the computer system in Embodiment 2.
Figure 17:
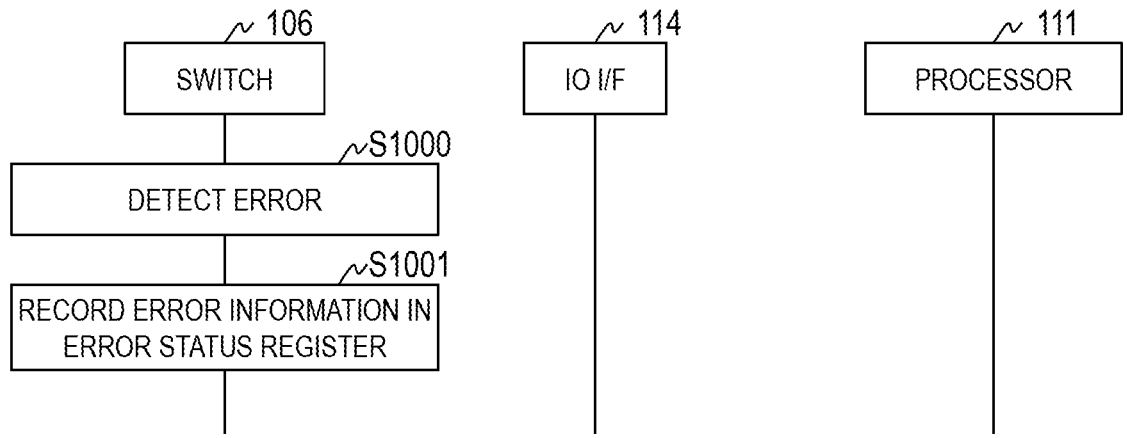

FIGS. 16 and 17 are sequence diagrams for illustrating the processing to be performed in a case where an error is detected in the computer system in Embodiment 2.

FIG. 16 illustrates the processing in a case where an error other than a device power error is detected. FIG. 17 illustrates the processing in a case where the device power error is detected.

The processing of FIG. 16 is described first. The downlink port 116 of the switch 106 detects an error (an error other than the device power error) about the IO device 102 (Step S900).

The downlink port 116 records the occurred error in the error status register 152 (Step S901). Step S901 is the same as Step S201. If the error is detected by the uplink port 115 of the switch 106, the uplink port 115 can perform the same processing.

Next, the switch 106 generates an error packet for notifying the error and sends the error packet to the IO I/F 114 (Step S902). The error packet includes information such as the identification number of the device where the error has occurred, the description of the error, the identification number of the device that has detected the error, and like. For example, in the case where the downlink port 116 has detected the error, the error packet includes the identification number assigned to the downlink port 116.

Steps S903 to S905 are the same as Steps S203 to S905 and therefore, the description thereof is omitted herein.

Next, the processing of FIG. 17 is described. The downlink port 116 of the switch 106 detects an error (the device power error) about the IO device 102 (Step S1000). The downlink port 116 of the switch 106 records the error in the error status register 152 (Step S1001). Steps S1000 and S1001 are the same as Steps S900 and S901.

The switch 106 determines that the detected error is the device power error based on the error mask register 153. Accordingly, the switch 106 terminates the processing without generating an error packet.

For the device power error, an interruption to the processor 111 is not generated. Accordingly, the processor 111 detects the device power error by polling the error status register 142 held by the IO I/F 114 and the error status register 152 held by the downlink port 116.

In either case where the device power error or an error other than the device power error occurs, "1" is stored to the error occurrence bit 402 in the error status register 152 as illustrated in FIGS. 16 and 17.

The processing to be performed by the processor 111 in a case of receiving an interruption is the same as the processing in Embodiment 1 and therefore, the description is omitted herein.

The polling processing to be performed by the processor 111 of the computer 100 in Embodiment 2 is partially different. Specifically, at Step S501, the error isolation unit 122 performs polling to the IO I/F 114 and the downlink port 116 of the switch 106. The rest of the processing is the same as the processing in Embodiment 1 and therefore, the description is omitted herein.

Embodiment 2 has the same effects as Embodiment 1, even though the computer 100 is connected with the IO device 102 via the switch 106.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a nonvolatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system comprising a plurality of computers,
each of the plurality of computers including a processor,
a memory coupled to the processor, and a device interface coupled to the processor, at least one of the plurality of computers being coupled to at least one device configured to coupled to other computers via the device interface, the computer system further comprising a first power supply configured to supply electric power to the plurality of computers and a second power supply configured to supply electric power to the at least one device, the at least one of the plurality of computers including an error isolation unit configured to periodically obtain values of an error status register holding information on errors occurring in the at least one device and a link status register holding information on a status of a link coupling the at least one of the plurality of computers and the at least one device and determine whether an error occurring in the at least one device is to be isolated, the device interface including the error status register and the link status register, and the error isolation unit being configured to:

determine whether an error occurs in the at least one device based on the error status register;

determine whether the error occurring in the at least one device is an error to be isolated based on the error status register and the link status register;

determine whether the error occurring in the at least one device is an error to be isolated based on values of the error status register and the link status register re-obtained after elapse of a predetermined time in a case where it is determined that the error occurring in the at least one device is not to be isolated; and detect the error occurring in the at least one device as an error of a protocol caused by stop of the second power supply in a case where it is determined that the error occurring in the at least one device is to be isolated;

wherein the error isolation unit is configured to:

determine whether the obtained value of the link status register is a value indicating a status of link down; and determine that the error occurring in the at least one device is an error not to be isolated in a case where the obtained value of the link status register is the value indicating the status of link down.

2. The computer system according to claim 1, wherein the error isolation unit is configured to manage monitoring information for monitoring errors occurring in the computer system, wherein the monitoring information includes a plurality of entries each including identification information for identifying a device in which an error occurs and time information for indicating a time of detection of occurrence of an error, and wherein the error isolation unit is configured to:

refer the monitoring information to determine whether a time is set to the time information of an entry corresponding to the at least one device in which the error occurs in a case where it is determined that the error occurring in the at least one device is not to be isolated;

set a time to the time information and re-obtain values of the error status register and the link status register in a case where it is determined that no time is set to the time information of the entry corresponding to the at least one device in which the error occurs;

determine whether a current time is a time later than a time set to the time information by a predetermined time in a case where it is determined that the time is set to the time information of the entry corresponding to the at least one device in which the error occurs;

re-obtain values of the error status register and the link status register without detecting the error as an error in hardware in a case where it is determining that the current time is not a time later than the time set to the time information by the predetermined time; and detect the error as an error in hardware in a case where it is determined that the current time is a time later than the time set to the time information by the predetermined time.

3. The computer system according to claim 2, wherein the error isolation unit is configured to generate an interruption for the processor in a case of failing in obtaining at least either one of a value of the error status register and a value of the link status register.

4. The computer system according to claim 1, wherein the device interface includes a mask register for setting whether to notify the processor of an error occurring in the at least one device for each description of error, wherein a value not to notify the processor of an error that occurs in an event of stop of the second power supply is set to the mask register, and wherein the device interface is configured to:

set a value corresponding to a description of a detected error to the error status register in a case of detecting the error in the at least one device;

refer the mask register to determine whether the error occurring in the at least one device is an error to be notified the processor; and generate an interruption for the processor in a case where it is determined that the error occurring in the at least one device is an error to be notified the processor.

5. The computer system according to claim 4, wherein the at least one computer is coupled to the at least one device via a switch having at least one uplink port and at least one downlink port, and wherein the at least one downlink port includes the error status register, the link status register, and the mask register.

6. An error isolation method for a computer system including a plurality of computers, each of the plurality of computers including a processor, a memory coupled to the processor, and a device interface coupled to the processor, at least one of the plurality of computers being coupled to at least one device configured to coupled to other computers via the device interface, the computer system further including a first power supply configured to supply electric power to the plurality of computers and a second power supply configured to supply electric power to the at least one device, the at least one of the plurality of computers including an error isolation unit configured to periodically obtain values of an error status register holding information on errors occurring in the at least one device and a link status register holding information on a status of a link coupling the at least one of the plurality of computers and the at least one device and determine whether an error occurring in the at least one device is to be isolated, the device interface including the error status register and the link status register, and the error isolation method including:

a first step of determining, by the error isolation unit, whether an error occurs in the at least one device based on the error status register;

a second step of determining, by the error isolation unit, whether the error occurring in the at least one device is an error to be isolated based on the error status register and the link status register;

a third step of determining, by the error isolation unit, whether the error occurring in the at least one device is an error to be isolated based on values of the error status register and the link status register re-obtained after elapse of a predetermined time in a case where it is determined that the error occurring in the at least one device is not to be isolated; and a fourth step of detect, by the error isolation unit, the error occurring in the at least one device as an error of a protocol caused by stop of the second power supply in a case where it is determined that the error occurring in the at least one device is to be isolated;

wherein the second step includes:

a step of determining, by the error isolation unit, whether the obtained value of the link status register is a value indicating a status of link down; and a step of determining, by the error isolation unit, that the error occurring in the at least one device is an error not to be isolated in a case where the obtained value of the link status register is the value indicating the status of link down.

7. The error isolation method according to claim 6, wherein the error isolation unit is configured to manage monitoring information for monitoring errors occurring in the computer system, wherein the monitoring information includes a plurality of entries each including identification information for identifying a device in which an error occurs and time information for indicating a time of detection of occurrence of an error, and wherein the third step includes:

a step of referring, by the error isolation unit, the monitoring information to determine whether a time is set to the time information of an entry corresponding to the at least one device in which the error occurs in a case where it is determined that that the error occurring in the at least one device is not to be isolated;

a step of setting, by the error isolation unit, a time to the time information and re-obtaining values of the error status register and the link status register in a case where it is determinate that no time is set to the time information of the entry corresponding to the at least one device in which the error occurs;

a step of determining, by the error isolation unit, whether a current time is a time later than a time set to the time information by a predetermined time in a case where it is determined that the time is set to the time information of the entry corresponding to the at least one device in which the error occurs;

a step of re-obtaining, by the error isolation unit, values of the error status register and the link status register without detecting the error as an error in hardware in a case where it is determined that the current time is not a time later than the time set to the time information by the predetermined time; and a step of detecting, by the error isolation unit, the error as an error in hardware in a case where it is determined that the current time is a time later than the time set to the time information by the predetermined time.

8. The error isolation method according to claim 7, wherein the first step and the third step include a step of generating, by the error isolation unit, an interruption for the processor in a case of failing in obtaining at least either one of a value of the error status register and a value of the link status register.

9. The error isolation method according to claim 6, wherein the device interface includes a mask register for setting whether to notify the processor of an error occurring in the at least one device for each description of error, wherein a value not to notify the processor of an error that occurs in an event of stop of the second power supply is set to the mask register, and wherein the error isolation method further includes:

a step of setting, by the device interface, a value corresponding to a description of a detected error to the error status register in a case of detecting the error in the at least one device;

a step of refer, by the device interface, the mask register to determine whether the error occurring in the at least one device is an error to be notified the processor; and a step of generating, by the device interface, an interruption for the processor in a case where it is determined that the error occurring in the at least one device is an error to be notified the processor.

10. The error isolation method according to claim 9, wherein the at least one computer is coupled to the at least one device via a switch having at least one uplink port and at least one downlink port, and wherein the at least one downlink port includes the error status register, the link status register, and the mask register.

* * * * *